Dec. 2, 1930.
R. B. FAGEOL
ROAD VEHICLE
Original Filed April 23, 1923 2 Sheets-Sheet 1
Re. 17,889
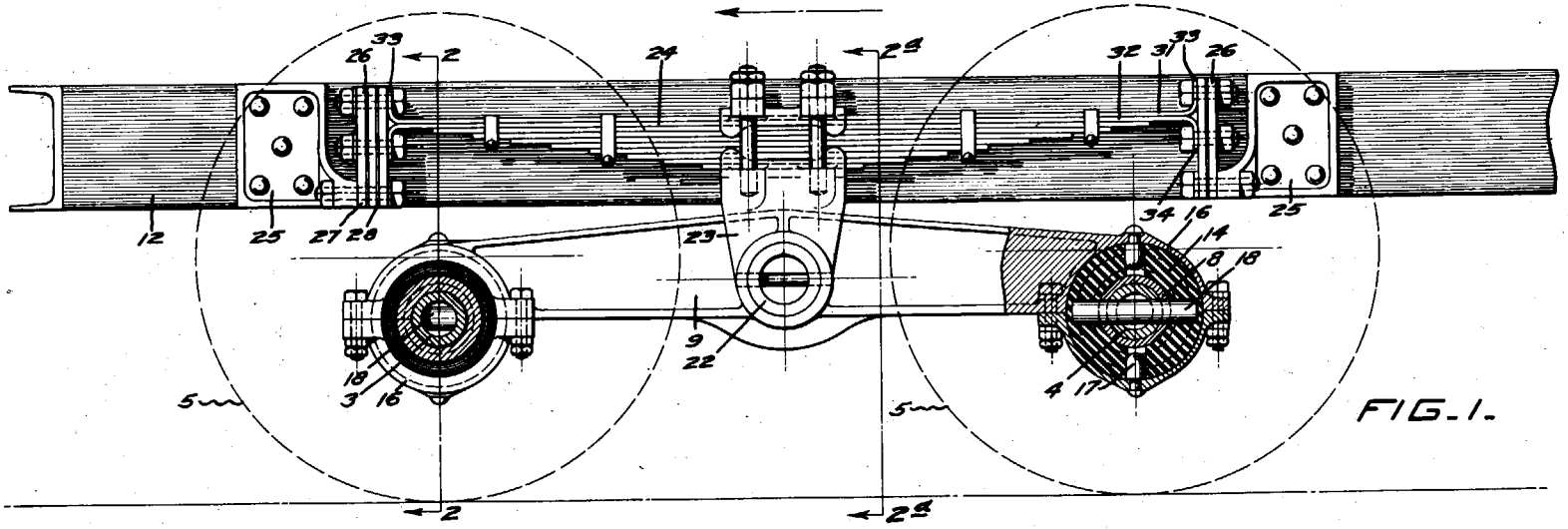
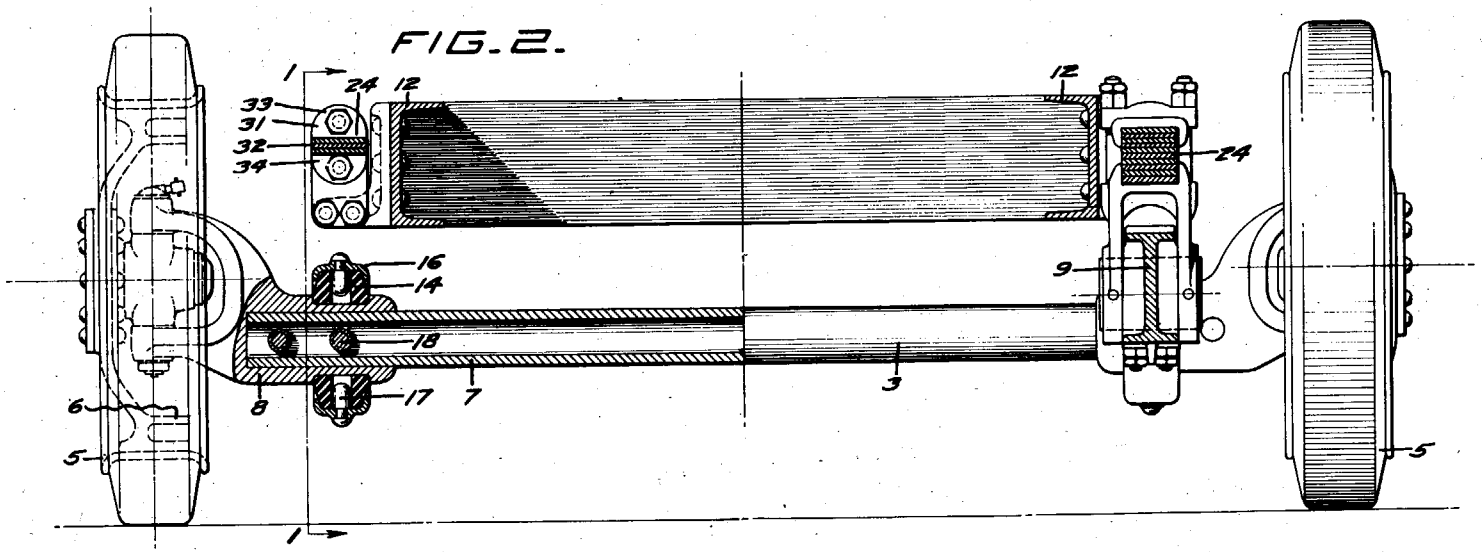
INVENTOR.
ROLLIE B. FAGEOL
BY White Prost & Evans
HIS ATTORNEYS.

Dec. 2, 1930. R. B. FAGEOL Re. 17,889

ROAD VEHICLE

Original Filed April 23, 1923 2 Sheets-Sheet 2

INVENTOR
ROLLIE B. FAGEOL
White Prost & Evans
HIS ATTORNEYS.

Reissued Dec. 2, 1930 Re. 17,889

UNITED STATES PATENT OFFICE

ROLLIE B. FAGEOL, OF LOS ANGELES, CALIFORNIA, ASSIGNOR TO THE EIGHT WHEEL MOTOR VEHICLE COMPANY, OF SAN FRANCISCO, CALIFORNIA, A CORPORATION OF CALIFORNIA

ROAD VEHICLE

Original application filed April 23, 1923, Serial No. 633,867. Renewed April 7, 1928. Original No. 1,692,891, dated November 27, 1928. Application for reissue filed January 24, 1930. Serial No. 423,241.

This invention relates to road vehicles and particularly to the running gear and spring suspension of such vehicle. The invention further relates to road vehicles having axles arranged in pairs, a pair of axles being connected together to form a truck. This construction is applicable to six-wheeled vehicles employing one four-wheeled truck and two eight-wheeled vehicles employing two four-wheeled trucks. I prefer to employ the invention in connection with an eight-wheeled vehicle having a four-wheeled front truck, the wheels of which are dirigible to steer the vehicle and a four-wheeled rear truck, the wheels of which are driven to propel the vehicle.

An object of the invention is to provide a spring suspension for a road vehicle which will produce improved riding qualities of the vehicle.

Another object of the invention is to provide a four-wheeled truck construction which will produce easy riding over rough and uneven roads.

A further object of the invention is to provide a longitudinal cushion between the truck and the vehicle frame to reduce the strain and jerks due to acceleration and deceleration.

Another object of the invention is to provide a four-wheeled truck in which the axles may move relatively bodily without producing strains in the truck frame or the vehicle frame.

A further object of the invention is to provide a four-wheeled truck construction which will minimize the transfer of load shocks from the wheels to the vehicle frame.

The invention possesses other advantageous features, some of which, with the foregoing, will be set forth at length in the following description where I shall outline in full, that form of my invention which I have selected for illustration in the drawings accompanying and forming part of the present specification. In said drawings I have shown several different embodiments of my invention, but it is to be understood that I do not limit myself to the forms shown, since the invention, as set forth in the claims, may be embodied in a plurality of other forms.

Referring to said drawings:—

Figure 1 is a vertical section of a front four-wheeled truck, taken on the line 1—1, Figure 2, a portion of the structure being broken away to disclose the arrangement of the connection between the bolster and one axle.

Figure 2 is a vertical section through the truck, the left hand portion of the figure being a section taken on the line 2—2, Figure 1, and the right hand portion of the figure being a section taken on the line $2^a$—$2^a$, Figure 1.

Figure 4:
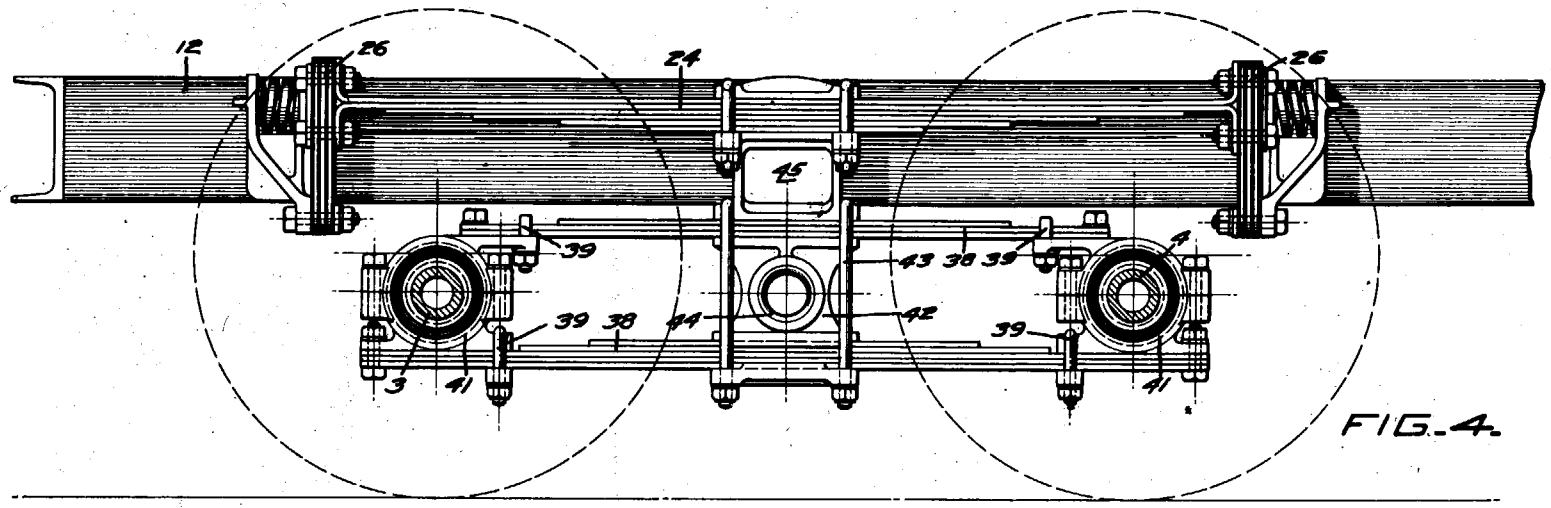
Figure 4 is a vertical longitudinal section of a front truck, showing a further modified form of construction.

The truck construction and spring suspension of my invention are particularly adapted for use in connection with eight-wheeled road vehicles having four front steering wheels and four rear driving wheels. In the drawings, I have shown the invention as applied to the front steering wheels, but it is to be understood that the invention is also applicable to the rear driving wheels. The truck of my invention comprises two parallel transverse axles 3—4, each axle being provided at its ends with road engaging wheels 5. These wheels may be either steering wheels or driving wheels and preferably all of the wheels are provided with brake drums 6, so that all eight wheels of the vehicle may be subjected to the braking effect. The front axles are preferably formed of a tube 7, having forged yokes 8, secured thereto at the ends, the ends of the yokes being formed to receive the pivot pin of the wheel. The tread of the wheels may be varied by varying the length of the tube 7.

The axles 3—4, comprising a truck, are connected together adjacent their ends by a longitudinally extending, rigid bolster 9, the bolsters being arranged at opposite sides of the vehicle frame 12. In traveling over roads, the two axles must be so connected that they are capable of independent movement with respect to each other, in order that the frame may be relieved of destructive strains and this movement is provided for by the connection between the axles and the ends of the bolsters. The construction is such that the respective axles are permitted to assume varying angular positions in the vertical plane, with respect to each other and are permitted a slight rotation with respect to each other. As the vehicle travels along a road, one wheel may run over an elevation throwing one side of the axle upwardly and the connection between the bolster and the axle is such, that this action can take place without subjecting the bolster to strains. This is accomplished by inserting a block of resilient material 14, such as rubber, between the axle and the bolster. The yoke 8 on the axle, is provided with a circumferential groove in which the block 14 is seated and the bolster is provided on its end with a circular seat 16, which surrounds and clamps the periphery of the block. Secured to the bolster and extending into the block 14, are pins or projections 17, which prevent rotation of the block with respect to the bolster. Extending through the axle, at right angles to the pins 17, is a pin 18, which also extends into the block 14, preventing rotation of the axle with respect to the block. Sections of the block are thus contained in the seat 16, between the pins 17 and 18, and since the block is of resilient or conformable material, a slight rotational movement of the axle, with respect to the bolster is provided. The interposition of the block of conformable material, between the bolster seats 16 and the axle, also permits the axle to assume varying angular positions in the vertical plane, by deforming the blocks, without subjecting the bolster to strain.

Figure 3:
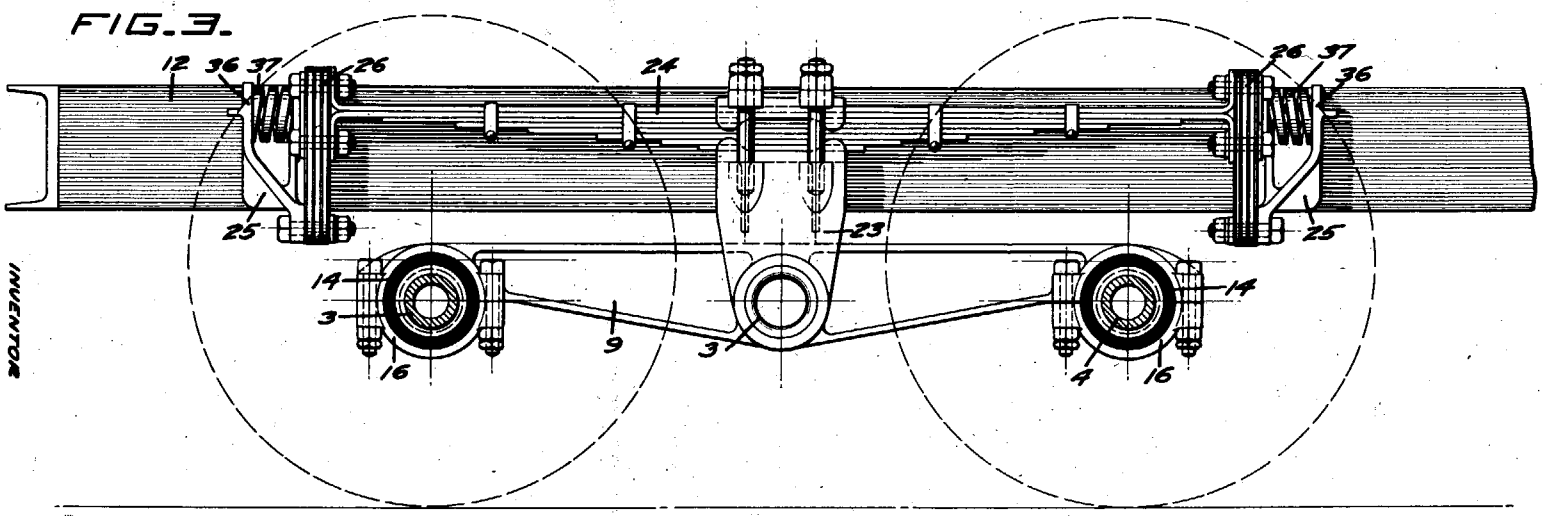
Figure 3 is a vertical longitudinal section of a front truck, showing a modified form of construction.

The bolster is pivotally supported at its center so that it may oscillate in a vertical plane as the wheels strike obstructions in the road. The pivot or stub shaft 22, on which the bolster is mounted, is carried by a bracket 23, which is suitably secured to the center of the load carrying spring beam 24, there being one such spring beam on each side of the frame, for each truck. To minimize the amount of motion transferred to the spring, due to vertical movement of one axle, as when the wheels on that axle are crossing an elevation in the road, the axis of the pivot 22 is placed in a plane below the plane passing through the axes of the wheels 5. The axis of the pivot 22 is preferably disposed in the plane of the axes of the axles at the point where they pass through the blocks 14 in the bolster seat, as is shown in Figures 3 and 4, but it is not essential that the axis of the pivot 22 be placed that low, as long as it occurs below the plane passing through the axes of the wheels.

Means are provided for flexibly connecting the end of the leaf spring 24 with the frame 12, so that the spring may readily flex under varying loads on the vehicle. I have produced a simple and efficient form of shackle connection between the end of the leaf spring and the vehicle frame, which connection requires no lubrication and which is practically free from wear. The shackle connections are preferably formed of strips of fabric, such as is used for lining brake bands, alternating with thin strips of steel, of such thickness that they are readily flexible.

Secured to the frame 12 are spaced brackets 25, to the lower ends of which are secured the flexible shackles 26, each shackle consisting of a plurality of strips of fabric 27, alternating with strips of flexible metal 28. The ends of the spring beam 24 are secured to the flexible shackle 26 above the point of their connection with the bracket 25 so that a flexible connection is provided between the ends of the springs and the bracket 25. The upper leaf 31 of the leaf spring 24 is turned upward on its ends to form flanges 33 and these flanges are secured to the flexible shackles 26 by bolts extending through the flanges and the shackles. The ends of the next leaf 32, are turned down to form flanges 34 and these flanges are secured to the shackles 26 by bolts passing through the flanges and the shackles. The flanges 33 and 34 lie in the same vertical plane and due to the curvature of the bend between the leaf and the flange, the two upper leaves of the spring are permitted a slight sliding movement with respect to each other as the flexure of the spring varies.

By hanging the frame from the end of the spring, on flexible shackles, the frame has a limited longitudinal movement with respect to the spring, which produces cushioning movement during acceleration and deceleration of the vehicle. This swinging movement relieves the frame of strains and jolts and produces a very easy riding vehicle. To prevent this swinging movement from continuing, after it has been initiated, I provide means for limiting the swinging movement and damping it. In the construction shown in Figure 3 I have provided the bracket 25 with backing walls 36 and between the backing walls and the upper portions of the flexible shackles, I have inserted coiled springs 37, which are normally under slight compression. These springs 37 are alined with the upper leaves of the leaf spring and serve to cushion the swinging movement of the leaf spring with respect to the frame. The flexible and resilient shackles and coil springs 26 and 37 respectively, cooperate with the rubber cushions aforedescribed to absorb or dampen out all vibration and minor road shocks.

Instead of making the bolster 9 of a casting or forging, as is shown in Figures 1 and 3, it may be built up of leaves, as shown in Figure 4, the leaves being tightly clamped together so that they present a substantially rigid structure, thus preventing any material difference in distance between the axles. The leaves 38, of which the bolster is built up, are clamped together by bolts 39, which also clamp the leaves to the housings 41 in which the block of conformable material is disposed. At their centers, the leaves 38 are clamped to the bracket 42 by the bolts 43 and the bracket 42 is journaled on the pin or stub shaft 44 which is carried by the bracket 45 secured to the load carrying leaf spring.

What I claim is:

1. In a road vehicle, a pair of substantially parallel axles; means interconnecting said axles, said means comprising a leaf spring and connections permitting universal movement of each of said axles with relation to said spring; a bracket pivotally supported from the mid portion of said spring; a second leaf spring supported at its mid portion from said bracket; yielding connections supported from each end of said second spring; and a frame supported from said yielding connections.

2. A vehicle comprising a pair of substantially parallel axles; resilient means with the ends thereof supported from said axles by means of yielding universal connections; a member pivotally supported from the mid portion of said resilient means with its axis of movement substantially in the plane of said axles; a leaf spring supported at its mid portion from said bracket; a yielding member supported from each end of said leaf spring; and a frame supported movably with relation to said leaf spring from said yielding members.

3. The combination as set forth in claim 2 in which said resilient means comprises a pair of springs disposed on opposite sides of said axles.

4. In a road vehicle, a pair of substantially parallel axles, means interconnecting said axles, comprising connections including deformable blocks for permitting cushioned universal movement of each of said axles in relation to said means, a bracket pivotally supported from the mid-portion of said means, a leaf spring supported at its mid-portion from said bracket, yielding connections from each end of said spring and a frame supported from said yielding connections.

5. In a road vehicle, a pair of substantially parallel axles, housings carried by each of said axles and connected thereto by means including deformable blocks so that limited cushioned universal movement of each axle relative to the housing carried thereby is permitted, springs interconnecting said axles, said springs being disposed on opposite sides of the axles and connected to said housings, a bracket pivoted to said springs between the ends thereof, the axis of the pivot being substantially in the horizontal plane that contains the axes of the axles, and resilient means interconnecting said bracket and the frame, said resilient means being flexible in a direction substantially transverse to the length of said frame and in a direction substantially endwise of said frame.

6. In a road vehicle, a pair of substantially parallel axles, means interconnecting said axles including connections to the axles having deformable blocks permitting cushioned universal movement of each of said axles with relation to said means, a bracket pivotally supported from the mid-portion of said means with the axis of the pivot lying substantially in the horizontal plane containing the axes of the axles and resilient means to interconnect said bracket and the vehicle frame comprising a spring to resist the movement of said pivot in a direction transverse to the length of the frame, and further springs to resiliently resist the movement of said bracket endwise of said frame.

7. In a multi-wheel vehicle construction, a frame; a pair of substantially parallel axles beneath said frame; a set of wheels supporting each of said axles; a suspension system at each side of said frame, comprising a bolster interconnecting said axles, including deformable cushioning blocks disposed between said axles and the ends of the bolster to check the transmission of road shocks from said wheels to said bolster; and a load-supporting device, including further cushioning means, pivotally interconnecting the intermediate portion of said bolster with said frame.

8. In a multi-wheel vehicle construction, a frame; a pair of tandem axles arranged beneath one end of said frame; a set of wheels supporting each of said axles; and a suspension system at each side of said frame comprising a bolster having its ends connected to said axles at points below the axes of wheel rotation, whereby the load is carried by said axles at points below the axis of wheel rotation, and means interconnecting said frame and said bolster, said means including a trunnion mounting for the bolster disposed below the level of the wheel axes, whereby the load at each side of the frame is concentrated and stably supported entirely beneath the plane of the axes of wheel rotation.

9. In the apparatus defined in claim 8, the axes of the trunnion mounting and of the bolster connections with the axles all being disposed substantially in a single horizontal plane that is materially spaced below the horizontal plane of the axes of wheel rotation.

10. In a road vehicle, a frame; a transverse axle disposed beneath one end of said frame; and a longitudinally arranged suspension at each side of said frame; said suspensions including interconnections, between the frame and both ends of the axle, both interconnections being designed to resist torque reactions and at the same time to permit either end of said axle to rise with respect to the other without breaking or damaging the elements of said interconnections.

11. In a multiwheel road vehicle, a frame; a pair of tandem axles transversely disposed beneath one end of said frame; and a longitudinally arranged suspension interconnecting said axles and said frame at each side of the latter; each of said suspensions including a connection with the end of each of said axles, and every one of said connections being designed to resist the torque reactions of its corresponding axle and at the same time to permit said axle to tilt freely without tendency to damage said suspension.

In testimony whereof I affix my signature.

ROLLIE B. FAGEOL.